United States Patent
Schwantner et al.

(10) Patent No.: US 9,628,000 B2
(45) Date of Patent: Apr. 18, 2017

(54) METHOD FOR CONTROLLING A MOTOR USING PULSE WIDTH MODULATION (PWM)

(71) Applicants: AUDI AG, Ingolstadt (DE); CONTI TEMIC MICROELECTRONIC GMBH, Nuremberg (DE)

(72) Inventors: Bernhard Schwantner, Eichstaett (DE); Georg Kaeufl, Painten (DE)

(73) Assignees: AUDI AG, Ingolstadt (DE); CONTI TEMIC MICROELECTRONIC GMBH, Nuremberg (DE)

( * ) Notice: Subject to any disclaimer, the term of this patent is extended or adjusted under 35 U.S.C. 154(b) by 96 days.

(21) Appl. No.: 14/357,343

(22) PCT Filed: Nov. 2, 2012

(86) PCT No.: PCT/EP2012/004583
§ 371 (c)(1),
(2) Date: May 9, 2014

(87) PCT Pub. No.: WO2013/068087
PCT Pub. Date: May 16, 2013

(65) Prior Publication Data
US 2014/0306630 A1    Oct. 16, 2014

(30) Foreign Application Priority Data
Nov. 9, 2011 (DE) .......................... 10 2011 118 044

(51) Int. Cl.
*H02P 6/00* (2016.01)
*H04B 15/02* (2006.01)
(Continued)

(52) U.S. Cl.
CPC ............... *H02P 6/002* (2013.01); *H02P 6/28* (2016.02); *H02P 29/50* (2016.02); *H04B 15/025* (2013.01)

(58) Field of Classification Search
CPC .. H02M 2001/123; H02M 1/12; H02M 5/458; H02M 1/44
(Continued)

(56) References Cited

U.S. PATENT DOCUMENTS 5,479,557 A     12/1995   Ganz et al.
5,519,889 A *   5/1996    Hipp ....................... H02M 1/12
                                                              363/41
(Continued)

FOREIGN PATENT DOCUMENTS

CN    1808869    7/2006
DE    4336223    9/1994
(Continued)

OTHER PUBLICATIONS

WIPO provided English translation of the International Preliminary Report on Patentability mailed Jun. 12, 2014 for corresponding International Patent Application No. PCT/EP2012/004583.
(Continued)

*Primary Examiner* — Eduardo Colon Santana
*Assistant Examiner* — Devon Joseph
(74) *Attorney, Agent, or Firm* — Staas & Halsey LLP

(57) ABSTRACT

A method controls a motor using pulse width modulation (PWM). The method involves measuring the PWM frequency; determining the carrier frequency of a set radio transmitter; and matching the PWM frequency to the carrier frequency of the radio transmitter in such a manner that an integer multiple of the PWM frequency corresponds to the carrier frequency or an integer multiple of the PWM frequency lies in the middle between two carrier frequencies.

14 Claims, 2 Drawing Sheets

(51) Int. Cl.
*H02P 6/28* (2016.01)
*H02P 29/50* (2016.01)

(58) Field of Classification Search
USPC ......................................................... 318/599
See application file for complete search history.

(56) References Cited

U.S. PATENT DOCUMENTS

| | | | | |
|---|---|---|---|---|
| 5,929,586 | A * | 7/1999 | Noro | B62D 5/046 318/581 |
| 6,819,077 | B1 * | 11/2004 | Seibel | H02M 7/53873 318/799 |
| 2001/0023176 | A1 * | 9/2001 | Talvitie | G01R 1/06772 455/67.14 |
| 2002/0007467 | A1 * | 1/2002 | Ma | G06F 1/025 713/501 |
| 2004/0047477 | A1 * | 3/2004 | Bank | H03F 3/181 381/120 |
| 2004/0156446 | A1 * | 8/2004 | Santhoff | H04B 1/71632 375/295 |
| 2004/0160207 | A1 * | 8/2004 | Kerkman | H02M 7/53875 318/801 |
| 2004/0232902 | A1 * | 11/2004 | Seibel | H02M 7/53873 323/284 |
| 2005/0140330 | A1 * | 6/2005 | Throngnumchai | H02P 21/05 318/807 |
| 2006/0072658 | A1 * | 4/2006 | Yasuda | H03K 7/08 375/238 |
| 2006/0082494 | A1 | 4/2006 | Deininger et al. | |
| 2006/0140286 | A1 * | 6/2006 | Goto | H02M 1/44 375/259 |
| 2007/0247881 | A1 * | 10/2007 | Hayami | H02M 1/12 363/58 |
| 2007/0252625 | A1 * | 11/2007 | Shin | H02M 1/44 327/113 |
| 2007/0268051 | A1 * | 11/2007 | Kerkman | H02M 1/44 327/175 |
| 2007/0268052 | A1 * | 11/2007 | Yin | H02M 1/12 327/175 |
| 2008/0089444 | A1 * | 4/2008 | Shin | H02M 1/12 375/326 |
| 2008/0157894 | A1 * | 7/2008 | Hariton | H03K 7/08 332/109 |
| 2009/0243744 | A1 * | 10/2009 | Beale | H03F 1/26 332/109 |
| 2009/0243903 | A1 * | 10/2009 | Khoury | H03K 7/08 341/143 |
| 2010/0090775 | A1 * | 4/2010 | Huda | H03K 7/08 332/117 |
| 2013/0026955 | A1 * | 1/2013 | Kikunaga | H02P 27/085 318/51 |
| 2013/0200828 | A1 * | 8/2013 | Miller | H02M 7/5395 318/400.23 |
| 2013/0214599 | A1 * | 8/2013 | Taira | H02M 7/537 307/31 |

FOREIGN PATENT DOCUMENTS

| | | |
|---|---|---|
| DE | 19834453 | 3/1999 |
| DE | 19934270 | 1/2001 |
| DE | 10305741 | 9/2003 |
| DE | 102009039069 | 3/2011 |
| DE | 102011118044.7 | 11/2011 |
| JP | 2005-176529 | 6/2005 |
| JP | 2008-118248 | 5/2008 |
| WO | 97/05716 | 2/1997 |
| WO | PCT/EP2012/004583 | 11/2012 |

OTHER PUBLICATIONS

German Office Action for German Priority Patent Application No. 10 2011 118 044.7, issued Mar. 5, 2013, 5 pages.
English Language International Search Report for PCT/EP2012/004583, mailed Oct. 16, 2013, 2 pages.
Chinese Office Action dated Jan. 25, 2016 from Chinese Patent Application No. 201280054632.5, 7 pages.
Chinese Office Action dated Jun. 15, 2016 from Chinese Patent Application No. 201280054632.5, 6 pages.
German Examination Report dated Apr. 12, 2016 from German Patent Application No. 10 2011 118 044.7, 4 pages.

* cited by examiner

METHOD FOR CONTROLLING A MOTOR USING PULSE WIDTH MODULATION (PWM)

CROSS REFERENCE TO RELATED APPLICATIONS

This application is based on and hereby claims priority to International Application No. PCT/EP2012/004583 filed on Nov. 2, 2012 and German Application No. 10 2011 118 044.7 filed on Nov. 9, 2011, the contents of which are hereby incorporated by reference.

BACKGROUND

The invention relates to a method for controlling a motor using pulse width modulation (PWM).

In vehicles, electric motors which are controlled using pulse width modulation are used for different purposes. Examples include fan motors and also electrical adjustment systems. In this case, an electric motor has an associated controller which generates a sequence of square-wave pulses of which the width is modulated. In this way, the energy which is supplied to the electric motor is modulated, as a result of which the speed can be controlled. Conventional controllers are operated at a constant PWM frequency which can be, for example, 18 kHz or 20 kHz.

It is known that driving electric motors by pulse width modulation causes interference which is expressed as acoustic interfering noise, for example, during radio reception. Interference can occur as harmonics of the PWM frequency and is audible particularly when the harmonic has a similar frequency to a set radio transmitter.

WO 97/05716 A1 proposes using filters for reducing the radio interference in order to avoid interference owing to a motor which is controlled using pulse width modulation. Capacitors are used as filters.

The use of coils which are arranged in the controllers, in addition to capacitors, is also known. However, EMC measures of this kind are costly and require a great deal of installation space on the printed circuit boards but are sometimes not sufficiently effective.

SUMMARY

One possible object is to specify a method for controlling a motor using pulse width modulation, which method allows improved reduction of interference.

The inventors propose a method of the kind described in the introductory part, comprising: measuring the PWM frequency; determining the carrier frequency of a set radio transmitter; trimming the PWM frequency to the carrier frequency of the radio transmitter in such a way that an integer multiple of the PWM frequency corresponds to the carrier frequency, or that an integer multiple of the PWM frequency lies in the middle between two carrier frequencies.

The proposals are based on the knowledge that undesired interference can be avoided when the operating frequency of the controller with which the motor is controlled, said frequency being called the PWM frequency in the text which follows, coincides with the carrier frequency or when a multiple of the PWM frequency coincides with the carrier frequency. If harmonics of the PWM frequency correspond exactly to a multiple of the carrier frequency, said harmonics are not audible since they lie at the carrier frequency. Therefore, the PWM frequency is slightly readjusted until said PWM frequency or a multiple of the PWM frequency coincides with the carrier frequency. In the relevant frequency band, the radio waves are transmitted using amplitude modulation, but there is no audio signal at the carrier frequency, and accordingly interference which has been caused by the pulse width modulation and which may occur is not audible.

According to a development of the method, provision can be made for the PWM frequency to be trimmed using a prescaler. Trimming of the PWM frequency using a prescaler of this method is implemented using corresponding software. Readjustment is performed by a parameter in the software, and therefore a multiple of the PWM frequency corresponds exactly to the carrier frequency of the radio transmitter.

The proposal also includes the PWM frequency being slightly adapted when the difference between the multiple of the PWM frequency and the carrier frequency of the radio transmitter exceeds a defined limit value. By defining (measuring) the carrier frequency of the set radio transmitter and comparing the results with the multiple of the PWM frequency, it is possible to establish whether there is a difference, and in this case readjustment can be performed once again by adapting the PWM frequency. This readjustment or adaptation can be performed continuously or after a defined period of time has passed or when the difference has exceeded a defined limit value.

In the method, provision can be made for the PWM frequency to be cyclically changed for adaptation purposes. These cyclical changes cause slight changes in frequency, the digital prescaler is cyclically varied by one or two bits for this purpose, and therefore a frequency sweep is carried out. As a result, the energy of the interference signal is distributed between several adjacent frequencies. This measure results in additional attenuation of a residual interference signal which is still audible under certain circumstances.

The inventors additionally propose a controller for an electric motor which is actuated using pulse width modulation (PWM), comprising a quartz crystal or resonator for generating a PWM frequency.

The controller is distinguished in that it is designed to measure the PWM frequency and to match an integer multiple of the PWM frequency to the carrier frequency of the radio transmitter in such a way that an integer multiple of the PWM frequency corresponds to the carrier frequency. The controller also comprises refinements in which the carrier frequency is measured or detected outside the controller in a separate component.

The inventors additionally propose a motor vehicle. The motor vehicle comprises a controller of the described kind which is designed to carry out the described method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
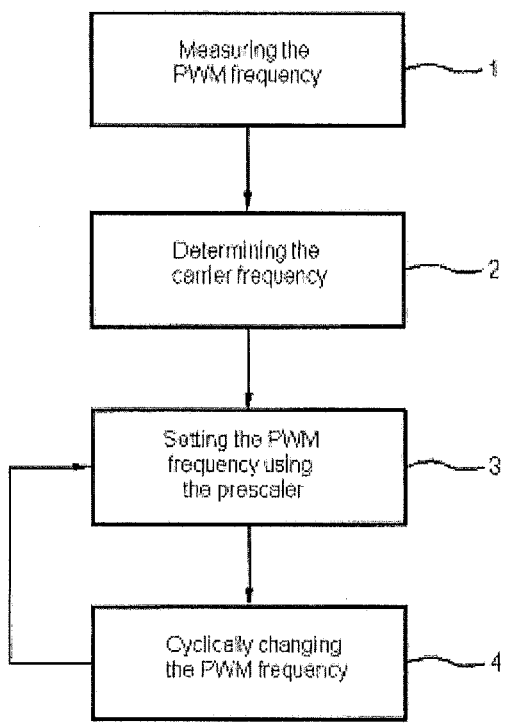
FIG. 1 shows the important parts of the proposed method in a flowchart.

Reference will now be made in detail to the preferred embodiments of the present invention, examples of which are illustrated in the accompanying drawings, wherein like reference numerals refer to like elements throughout.

FIG. 1 is a flowchart and shows the important parts of the method for controlling a motor using pulse width modulation (PWM). Audible interference which is perceived, for example, during radio reception is intended to be eliminated by the method. Interference of this kind can be caused by electric motors which are controlled using pulse width modulation. During pulse width modulation, signals with a frequency of, for example, 18 kHz or 20 kHz are generated in order to set a specific motor rotation speed and a torque.

In 1, the PWM frequency, that is to say that frequency at which the motor is driven, is measured. Although the clock signal is generated fundamentally exactly by a quartz crystal or resonator, there may be an at least slight deviation in the setpoint frequency of, for example, 18 kHz or 20 kHz owing to tolerances, temperature influences or component aging. Accordingly, the current actual frequency is exactly measured in 1.

In 2, the radio frequency of a currently set radio transmitter is determined by measurement. The radio frequency is determined with the same accuracy as the PWM frequency. In the case of broadcast radio signals which are emitted in an amplitude-modulated manner, the carrier frequency, which is, for example, 180 kHz in the longwave band (LW), is determined in particular.

In 3, the PWM frequency is set by a prescaler. The prescaler is a constituent part of a controller which drives the electric motor using PWM. The PWM frequency is set in such a way that an integer multiple of the PWM frequency corresponds to the carrier frequency. The PWM frequency is therefore matched to the carrier frequency, so that harmonics of the PWM frequency which may occur exactly match the carrier frequency of the emitted broadcast radio signal. When the carrier frequency is, for example, 180 kHz, the PWM frequency is set to 18 kHz, the carrier frequency then corresponding to 10 times the PWM frequency. Interference in the form of harmonics which normally lead to audible interference during radio reception are naturally generated when the electric motor is driven by pulse width modulation. However, when the PWM frequency is set such that its harmonic is 180 kHz and coincides with the carrier frequency of the broadcast radio signal, no audible interference is produced since the trimmed harmonic is at the carrier frequency. In the case of amplitude modulation, the audio signal is transmitted in frequency ranges above and below the carrier frequency, said frequency ranges containing no interference since no harmonic of the PWM frequency occurs there.

In 4, the PWM frequency is cyclically adapted, so that the PWM frequency is continuously matched to the carrier frequency. Similarly, different reception conditions are compensated for in this way, so that interference-free reception is ensured irrespective of the current location of a vehicle. The cyclic adaptation of the PWM frequency which is provided in 4 is an optional measure; as an alternative, it is also possible for 3, setting the PWM frequency using the prescaler, to be carried out at defined time intervals. The PWM frequency is cyclically changed for the purpose of matching the PWM frequency to the carrier frequency when it is not possible to exactly match the PWM frequency to the carrier frequency. In this case, the energy of the interference signal is distributed between several frequencies by a frequency sweep, as a result of which a residual interference signal which is audible during radio reception and may still be present is additionally attenuated. Finally, the method is continued with 3, so that the PWM frequency is reset.

Figure 2:
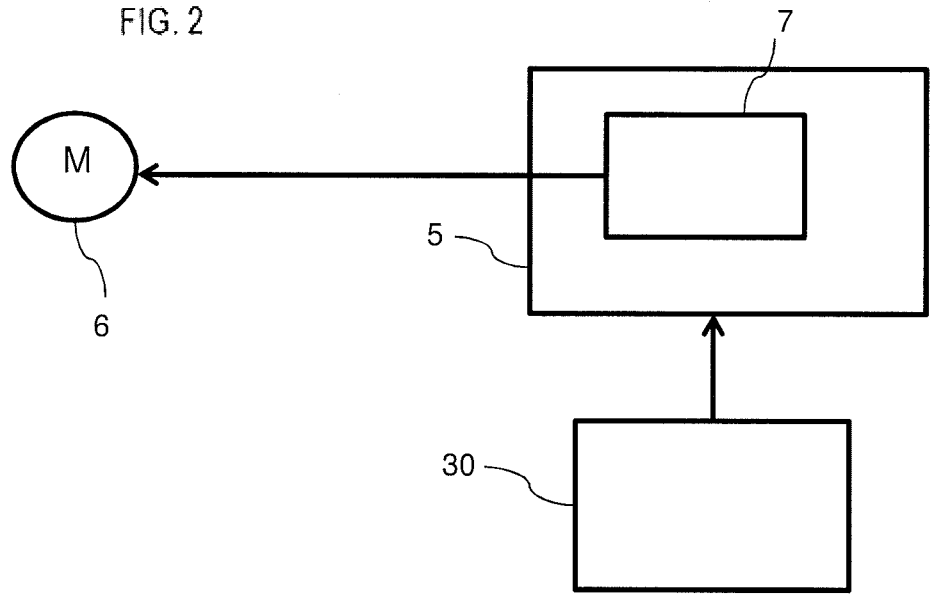
FIG. 2 shows a proposed controller.

FIG. 2 schematically shows a controller 5 in order to drive an electric motor 6 by pulse width modulation. The controller 5 comprises a prescaler 7 in order to match a multiple of the PWM frequency to the carrier frequency. The controller 5 is also designed to measure the PWM frequency and to determine the radio frequency or the carrier frequency of the broadcast radio signal of radio transmitter 30.

Figure 3:
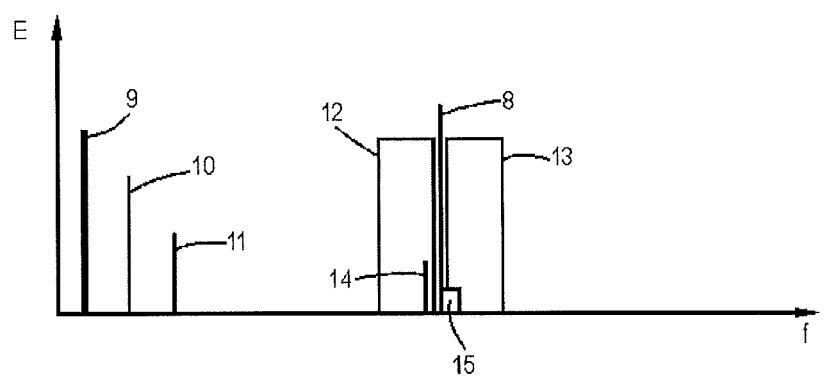
FIG. 3 shows a graph in which the energy content is plotted against the frequency.

FIG. 3 is a graph in which the energy content (E) of the PWM frequency and of the emitted broadcast radio signal is plotted against the frequency (f). In the exemplary embodiment shown in FIG. 3, the carrier frequency 8, which is measured in 2, of a radio signal is 180 kHz in the LW band. In 1, the PWM frequency is precisely detected by a measurement and in 3 is set such that a multiple of the PWM frequency 9 corresponds exactly to the carrier frequency 8. Normally, the PWM frequency 9 deviates at least slightly from a setpoint value at which no interference occurs. In this case, the prescaler 7 performs an adaptation in order to change the PWM frequency, for example from 17.95 kHz to 18 kHz. If exact setting or adaptation is not possible, the digital prescaler 7 performs a cyclic adaptation by one or two bits, as a result of which the sought multiple of the PWM frequency 9, which corresponds to the carrier frequency 8, is approximately reached. FIG. 3 shows harmonics 10, 11 of the PWM frequency 9, which harmonics are each integer multiples of the PWM frequency 9. FIG. 3 likewise shows that the audio signal is emitted in frequency ranges 12, 13 below and above the carrier frequency 8.

Without trimming by the described method, harmonics 14 which are caused by the PWM frequency 9 and which do not coincide with the carrier frequency 8 would occur, and therefore the harmonic 14 which is shown in FIG. 3 would be audible as interference when the radio is switched on. However, owing to the proposed method, interfering harmonics can be at least considerably reduced, so that at most only harmonics 15 of which the energy content is considerably reduced in comparison to the harmonic 14 remain. Since the harmonic 15 is virtually at the carrier frequency 8, it is not audible.

Figure 4:
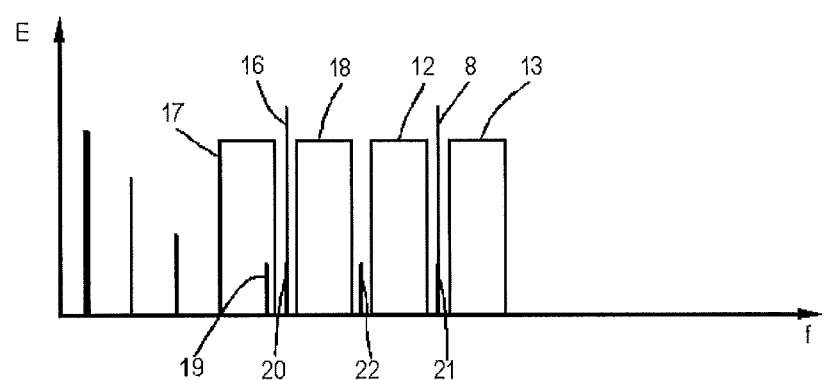
FIG. 4 shows a further graph in which the energy content is plotted against the frequency.

FIG. 4 shows a similar graph to FIG. 3, in which the energy content is plotted against the frequency. In contrast to the preceding exemplary embodiment, an emitted broadcast radio signal comprises two carrier frequencies 8, 16. The carrier frequency 8 has associated frequency ranges 12, 13 below and above the carrier frequency 8. The carrier frequency 16 has an associated lower frequency range 17 and an associated upper frequency range 18, the audio signal being transmitted in said frequency ranges.

A harmonic 19 which lies within the frequency range 17 is audible as interference during radio reception. However, harmonics 20, 21 which coincide with the carrier frequencies 8, 16 or lie in a narrow frequency range around the carrier frequencies 8, 16, are not audible. A harmonic 22 is likewise scarcely audible as interference, the frequency of said harmonic lying in the middle between the two carrier frequencies 8, 16. Therefore, the PWM frequency can also be trimmed in such a way that a harmonic 22 is placed precisely between two carrier frequencies 8, 16, assuming that at least a narrow frequency range is present which is not required for transmitting audio signals. In the exemplary embodiment shown in FIG. 4, there is a "gap" between the frequency ranges 12, 18, and therefore the harmonic 22 can be trimmed such that it lies exactly in this gap, in order to avoid undesired acoustic interference.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for controlling a motor using pulse width modulation (PWM), comprising:
    measuring, by a controller, a PWM frequency;
    determining, by the controller, one or more currently set carrier frequencies of a radio transmitter; and
    trimming, by a prescaler, the PWM frequency to a select carrier frequency of the one or more currently set carrier frequencies, so that an integer multiple of the PWM frequency coincides with the select carrier frequency, or when there are at least two currently set carrier frequencies, so that an integer multiple of the PWM frequency lies in a middle between the two currently set carrier frequencies,
    wherein
    the select carrier frequency corresponds to a radio signal currently broadcast by the radio transmitter,
    when there are at least two currently set carrier frequencies at least one other integer multiple of the PWM frequency coincides with at least one of the at least two currently set carrier frequencies, and
    a currently set carrier frequency among the at least two currently set carrier frequencies which coincides with an integer multiple of the PWM frequency corresponds to a radio signal currently broadcast by the radio transmitter.

2. The method according to claim 1, wherein the PWM frequency is trimmed using a digital prescaler.

3. The method according to claim 1, further comprising:
    determining a difference between the multiple of the PWM frequency and the select carrier frequency of the radio transmitter; and
    slightly changing the PWM frequency if the difference exceeds a defined limit value.

4. The method according to claim 3, wherein the PWM frequency is cyclically changed for adaptation purposes.

5. The method according to claim 3, wherein the PWM frequency is changed by one or two bits to slightly change the PWM frequency.

6. The method according to claim 1, wherein the PWM frequency is trimmed at defined time intervals.

7. The method as claimed in claim 1, wherein
    there are two currently set carrier frequencies,
    for each currently set carrier frequency, audio information is transmitted in audio frequency bands adjacent to the carrier frequency,
    the PWM frequency is trimmed so that integer multiples of the PWM frequency each fall outside the audio frequency bands, and
    the PWM frequency is trimmed so that integer multiples of the PWM frequency falls on both of the currently set carrier frequencies respectively, and at least one integer multiple of the PWM frequency falls in the middle between the two currently carrier frequencies.

8. A method for controlling a motor using pulse width modulation (PWM), comprising:
    supplying power to the motor via a pulse width modulated signal having a PWM frequency;
    measuring, by a controller, the PWM frequency;
    identifying, by the controller, at least two currently set carrier frequencies of a radio transmitter; and
    trimming, by a prescaler, the PWM frequency so that an integer multiple of the PWM frequency lies in a middle between the two currently set carrier frequencies,
    wherein
    for each currently set carrier frequency, audio information is transmitted in audio frequency bands adjacent to the carrier frequency,
    the PWM frequency is trimmed so that a first integer multiple of the PWM frequency falls in the middle between the two currently set carrier frequencies and so that a second integer multiple of the PWM frequency coincides with one of the currently set carrier frequencies, and
    a currently set carrier frequency among the at least two currently set carrier frequencies which coincides with the second integer multiple of the PWM frequency corresponds to a radio signal currently broadcast by the radio transmitter.

9. The method as claimed in claim 8, wherein the PWM frequency is trimmed so that integer multiples of the PWM frequency each fall outside the audio frequency bands.

10. The method according to claim 8, wherein
    for each currently set carrier frequency, audio information is transmitted in audio frequency bands adjacent to the carrier frequency, and
    if the PWM frequency cannot be adjusted such that all integer multiples of the PWM frequency fall outside of the audio frequency bands, the PWM frequency is cyclically changed for adaptation purposes, to distribute interference energy over a plurality of frequencies.

11. A controller for an electric motor, comprising:
    a quartz crystal or resonator to generate a pulse width modulation (PWM) signal to power the motor, the PWM signal having a PWM frequency;
    a device to measure one or more currently set carrier frequencies of a radio transmitter; and
    a prescaler to trim the PWM frequency to a select carrier frequency of the one or more currently set carrier frequencies, so that an integer multiple of the PWM frequency coincides with the select carrier frequency, or when there are at least two currently set carrier frequencies, so that an integer multiple of the PWM frequency lies in a middle between the two currently set carrier frequencies,
    wherein
    the select carrier frequency corresponds to a radio signal currently broadcast by the radio transmitter,
    when there are at least two currently set carrier frequencies at least one other integer multiple of the PWM frequency coincides with at least one of the two currently set carrier frequencies, and
    a currently set carrier frequency among the at least two currently set carrier frequencies which coincides with an integer multiple of the PWM frequency corresponds to a radio signal currently broadcast by the radio transmitter.

12. The controller according to claim 11, wherein the prescaler to trim the PWM frequency is a digital prescaler.

13. The controller according to claim 11, wherein the PWM frequency is cyclically changed by one or two bits for adaptation purposes.

14. A motor vehicle, comprising a controller according to claim 11.

* * * * *